United States Patent [19]

Anderson

[11] Patent Number: 4,941,685
[45] Date of Patent: Jul. 17, 1990

[54] MULTIPLE PART FACSIMILE FORM

[75] Inventor: Michael W. Anderson, W. Seneca, N.Y.

[73] Assignee: Moore Business Forms, Inc., Grand Island, N.Y.

[21] Appl. No.: 272,211

[22] Filed: Nov. 17, 1988

[51] Int. Cl.$^5$ .......................... B41L 1/00; H04N 1/00; H04N 1/40

[52] U.S. Cl. .................................... 282/1 R; 358/256; 358/280; 358/400

[58] Field of Search .............. 282/1 R, 4, 9; 118/264; 358/256, 280; 340/780

[56] References Cited

U.S. PATENT DOCUMENTS

| | | |
|---|---|---|
| 2,365,716 | 12/1944 | Metzner . |
| 2,497,200 | 2/1950 | Appel . |
| 3,364,052 | 1/1968 | Martino .............................. 282/1 R |
| 3,959,571 | 5/1976 | Yahagi et al. . |
| 4,225,157 | 9/1980 | Hamacher ........................ 282/1 R |
| 4,295,664 | 10/1981 | Cutting . |
| 4,334,771 | 6/1982 | Ryan, Jr. . |
| 4,482,378 | 11/1984 | Riou et al. . |
| 4,623,391 | 11/1986 | Seitz . |
| 4,631,084 | 12/1986 | Sagawa . |
| 4,636,258 | 1/1987 | Hayashi et al. . |
| 4,714,276 | 12/1987 | Grieg . |
| 4,751,583 | 6/1988 | Levine ................................ 358/256 |
| 4,788,709 | 11/1988 | Matsumoto .......................... 358/256 |
| 4,789,902 | 12/1988 | Shimura .............................. 358/280 |
| 4,816,911 | 3/1989 | Kirsch et al. ........................ 358/256 |

OTHER PUBLICATIONS

"Rediform" Order Books & Sales Slips, pp. 353, 356, 357.

Primary Examiner—Douglas D. Watts
Assistant Examiner—Paul M. Heyrana
Attorney, Agent, or Firm—Nixon & Vanderhye

[57] ABSTRACT

Disclosed is a multi-part form comprising a form set with a first form part having prerecorded information thereon and overlying a second form part. Variable information recorded on the first form part is transferred to the second form part, preferably by carbonless transfer using infrared adsorptive dyes, such that the variable information appearing on the second form part is readable by current standard facsimile machines. The second form part is preferably blank, although a minimal quantity of prerecorded information may be provided on the second form part. The second form part is then used as the transmission copy for a facsimile machine whereby reduced time and costs of transmission is effected. The received copy of the facsimile transmission may be provided with an overlay whereby a reproduction of the first form part, including both variable and prerecorded information, may be provided.

9 Claims, 4 Drawing Sheets

| CUSTOMER'S ORDER NO. 36-104 | DEPT. | DATE 12/5/86 |
|---|---|---|

NAME Bill Jackson
ADDRESS 1862 Ontario Pl. NW, Wash DC 20009

| SOLD BY Monica | CASH | C.O.D. ✓ | CHARGE | ON ACCT. | MDSE. RETD. | PAID OUT |
|---|---|---|---|---|---|---|

| QUAN. | | DESCRIPTION | PRICE | AMOUNT |
|---|---|---|---|---|
| 3 | 1 | dimmer switches | 1.79 | 5 37 |
| 12 | 2 | yd. electrical cord | .59 | 7 08 |
| | 3 | | | |
| | 4 | | | 12 45 |
| | 5 | 6% Tax | | 74 |
| | 6 | | | |
| | 7 | TOTAL | $ | 13 19 |
| | 8 | | | |
| | 9 | | | |
| | 10 | | | |
| | 11 | | | |
| | 12 | | | |
| | 13 | | | |
| | 14 | | | |
| | 15 | | | |
| | 16 | | | |
| | 17 | | | |
| | 18 | | | |

REC'D BY Bill M. Jackson

KEEP THIS SLIP
FOR REFERENCE

MULTIPLE PART FACSIMILE FORM

BACKGROUND AND SUMMARY OF THE INVENTION

The present invention relates to a multi-part form for receiving variable information and particularly relates to a form having a first part with prerecorded information thereon and a second part with little or no prerecorded information thereon but which may receive the variable information recorded on the first part, preferably by carbonless transfer, whereby the second part may be used as a transmission copy for facsimile machines.

Facsimile machines are currently being used to a greater and greater extent. Apart from the initial costs of purchasing a facsimile machine, the cost of transmitting information by way of facsimile transmission is a function of the time of transmission and hence the quantity of information being transmitted. To reduce facsimile transmission costs, the quantity of information and hence time of transmission may be reduced consistent with the capacity to transmit intelligible information. One of the drawbacks of transmitting information according to current practice is the need to transmit known, for example, prerecorded, information, in conjunction with the variable information. For example, business forms are typically preprinted. When a business form is completed by typing or otherwise recording variable information on the preprinted form, the form itself or a copy of the form is used as the facsimile transmission document. This, of course, necessitates the transmission of both the known preprinted information, together with the variable information The recipient of the information is quite frequently well aware of the nature and extent of the preprinted information and oftentimes has the same form in blank with the preprinted information thereon. Consequently, the time and costs associated with the transmission of known preprinted information are, in many instances, totally unnecessary.

According to the present invention, there is provided a multi-part form, a first part of which has prerecorded, e.g., preprinted, information thereon, and a second part, which has a minimum of prerecorded information and may, in fact, be entirely blank without any prerecorded information. The first part of the form with the preprinted information thereon may be used to record the variable information in the appropriate spaces usually provided for such variable information. Transfer of the variable information onto the second form is provided. Preferably, carbonless transfer is employed using infrared adsorptive dyes such that the variable information recorded on the second part of the form may be recognized by all currently standard facsimile machines. Facsimile machines presently known to applicant will all recognize infrared adsorptive dyes, while not all facsimile machines will recognize dyes other than infrared adsorptive dyes. Consequently, in accordance with the present invention, only the second part of the two-part form may be employed as the transmission copy for the facsimile machine.

It will be appreciated that if such second part is initially blank and contains only the variable information transferred thereon from the first part, the time and hence the cost of the facsimile transmission will be substantially reduced in comparison with the time and costs of transmitting the same variable information by facsimile machine but including the non-variable information, similarly as if the first part was transmitted. More generally, the present invention provides a form set which facilitates recordation of variable information on the form while reducing the quantity of information transmitted by facsimile by using the second part of the form for transmitting substantially only the variable information with little or no, non-variable information thereon whereby facsimile transmission costs are substantially reduced.

Where it is desirable at the facsimile transmission receiving site to register the received variable information with the non-variable information previously contained on the first part of the form or with different non-variable information, an appropriate overlay may be used on the received copy. Thus, for example, the arrangement of the variable information on the received copy may match and register with the arrangement of non-variable information on an overlay similarly or differently as the non-variable information was originally on the first, non-transmitted, part of the form set. Thus, the transmitted variable information may regain its intelligible characteristics in registry with the non-variable information, if it is not otherwise intelligible per se.

Accordingly, in accordance with a preferred embodiment of the present invention, there is provided a multi-part form for receiving variable information and transmitting the variable information on a facsimile machine, comprising a form set having first and second form parts, with the first form part having preprinted information thereon and the second form part underlying the first form part and being entirely void of preprinted information thereon. Means are carried by the form set for transferring variable information recorded on the first part onto the second part such that the variable information recorded on the second part may be transmitted by facsimile using the second part as the facsimile transmittal copy In a further preferred embodiment of the present invention, there is provided a method of transmitting by facsimile machine variable information recorded on a form, comprising the steps of providing a form set having a first part with preprinted information thereon and a second part underlying the first part with a lesser content of preprinted information thereon, providing for carbonless transfer of variable information recorded on the first part onto the second part and transmitting the information on the second part by facsimile machine thereby transmitting information of reduced informational content on the second part as compared with the informational content of the first part to reduce facsimile transmission time and costs.

In a still further preferred embodiment of the present invention, there is provided a method of transmitting by facsimile machine variable information recorded on a form comprising the steps of providing a form set having a first part and a second part, recording information including variable information on the first part, providing for carbonless transfer of at least a portion of the variable information recorded on the first part onto the second part and transmitting the information on the second part by facsimile machine using the second form part as the transmittal document thereby transmitting at least the portion of the variable information on the second part whereby facsimile transmittal time and costs are reduced.

In a still further preferred embodiment of the present invention, there is provided a method for transmitting by facsimile machine variable information recorded on a form set and correlating the transmitted variable information with prerecorded information, comprising the steps of providing a form set having a first part and a second part, recording information including variable information on the first part, providing for carbonless transfer of at least a portion of the variable information recorded on the first part onto the second part, transmitting the information on the second part by facsimile machine using the second form part as the transmittal document thereby transmitting at least the portion of the variable information on the second part and recording the transmitted information at a facsimile machine receiving site on facsimile receiving paper. Prerecorded information is juxtaposed adjacent the received variable information on the facsimile receiving paper to facilitate correlation of the received variable information with the prerecorded information.

Accordingly, it is a primary object of the present invention to provide a novel and improved multi-part facsimile form set and a method of transmitting variable information by facsimile wherein the time and hence the costs of facsimile transmission can be greatly reduced.

These and further objects and advantages of the present invention will become more apparent upon reference to the following specification, appended claims and drawings.

BRIEF DESCRIPTION OF THE DRAWING FIGURES

FIG. 1 is a plan view of two parts of a form set in accordance with the present invention with the first form part offset from and, in part, overlying the second form part;

FIG. 4 is a plan view of the received information as copied by use of the overlay in FIG. 3.

DETAILED DESCRIPTION OF THE DRAWING FIGURES

Figure 2:
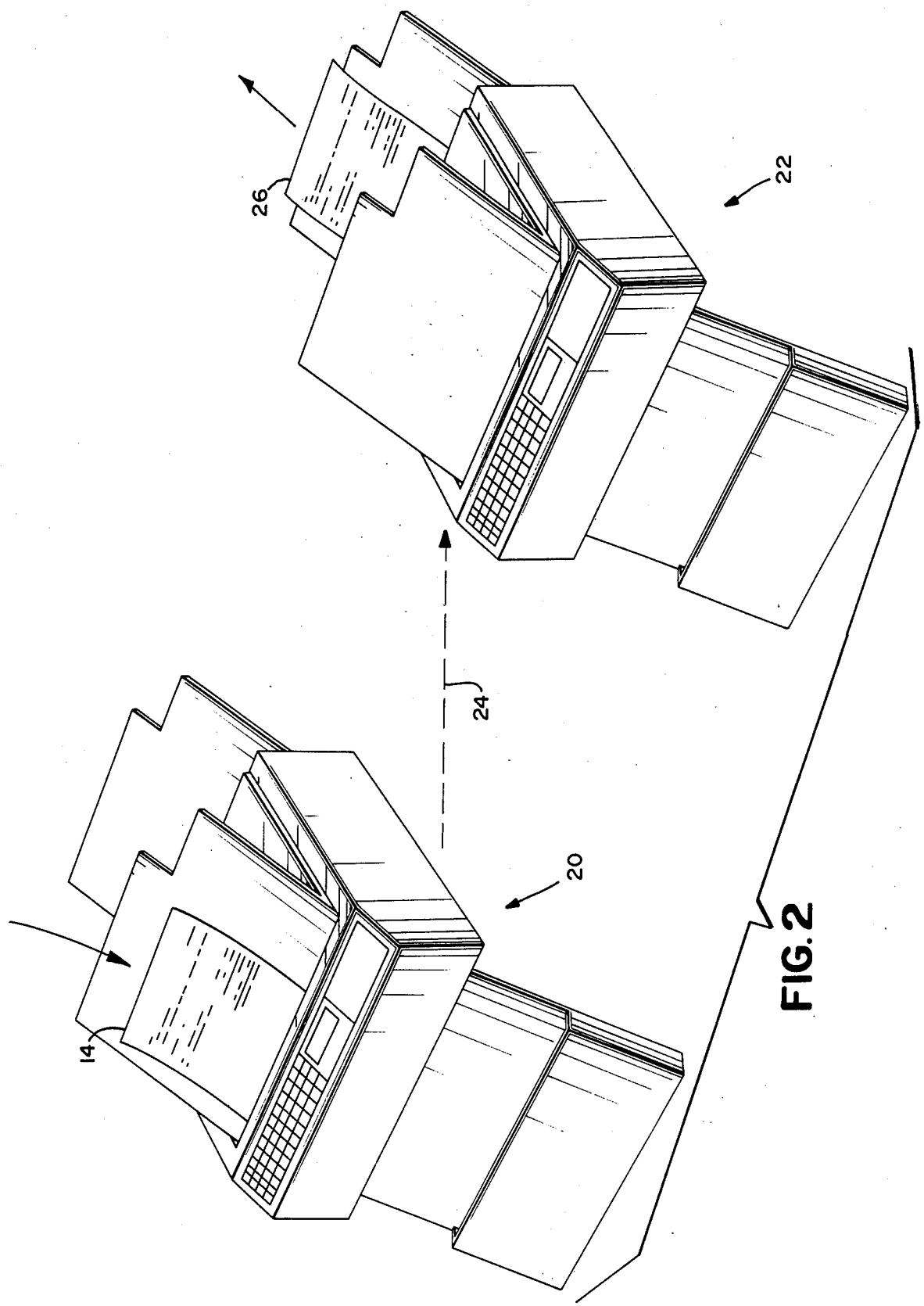
FIG. 2 is a schematic perspective view of a sending facsimile machine and a receiving facsimile machine with which the form set of the present invention may be employed.

Reference will now be made in detail to the present preferred embodiment of the invention, an example of which is illustrated in the accompanying drawings.

Figure 1:
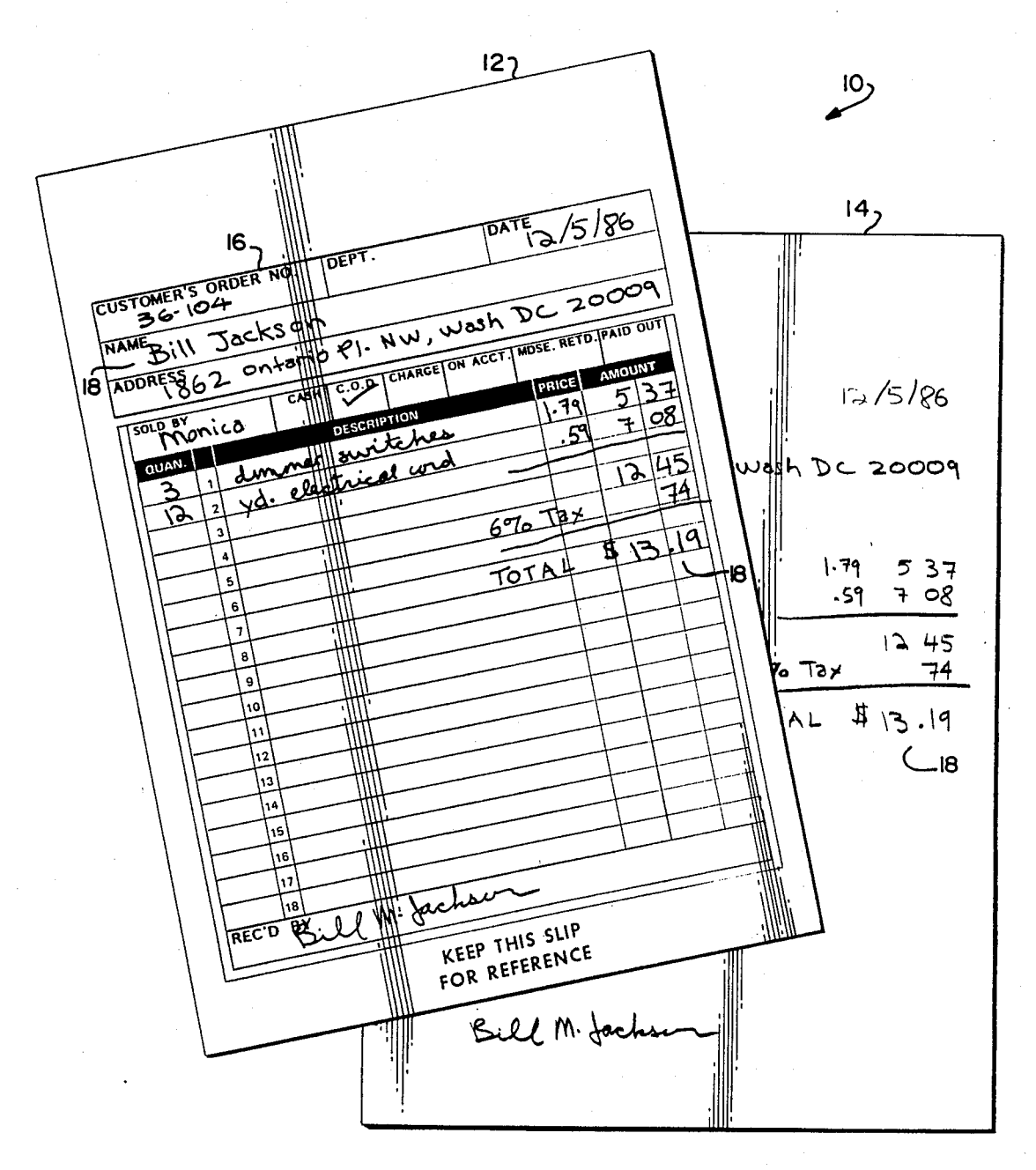

Referring now to the drawings, particularly to FIG. 1, there is illustrated a multi-part form, generally designated 10, for receiving variable information and transmitting variable information on a facsimile machine. The form 10 includes a form set having first and second form parts 12 and 14, respectively. While not illustrated, the form parts 12 and 14 may be releasably joined one to the other along corresponding edges, for example, by a suitable adhesive or mechanically or they may be joined by adhesive with registering lines of perforations whereby the forms may be detached one from the other along the lines of perforations. Alternatively, as illustrated, the two form parts may be initially loose and unattached relative to one another.

As illustrated in FIG. 1, the first form part 12 has prerecorded information thereon, i.e., in this case, preprinted information, designated 16. The prerecorded information may comprise a series of information blocks with indicators specifying the nature of variable information to be completed on the prerecorded form. For example, the date, customer order number, department, the name and address of a customer, the quantity, description price and amount of the products being sold, may be prerecorded on the first form part 12. Other types of prerecorded information, of course, may be provided on the first part 12 as desired. It will be appreciated that this prerecorded information 16 would be common to each of the first form part of a plurality of such form sets.

The first part 12 of the form 10 may thus be completed by recording variable information in the appropriate information blocks. For example, the name and address of the purchaser may be completed in the prerecorded block which specifies that such information should be completed in that block. Variable information, such as the quantity, description, price and amount of the products being sold may likewise be completed in the usual fashion on the form in the blocks specified for that type of information. Such information may be handwritten, typed, or otherwise, as desired.

The underside of the first form part 12 may carry a carbonless pressure-sensitive copy-making coating adapted to produce on an underlying, also coated, region of the upper surface of a next sheet, i.e., the second form part 14, a replica of what is pressed on the first form part 12 from above. Carbonless coatings for reproduction purposes are well known in this art, a representative example of which is disclosed in U.S. Pat. No. 4,199,174 of common assignee herewith. Preferably, in accordance with the present invention, rupturable micro-capsules containing infrared adsorptive dyes are provided as the coating along the underside of the form part 12 for reaction with the coating on the form part 14. Such coating may comprise any one or more of the infrared adsorptive dyes disclosed in U.S. Pat. Nos. 4,631,084; 4,623,391; 4,482,378; 4,636,258; and 3,959,571. Infrared adsorptive dyes are employed as the carbonless transfer agent in the present invention because such dyes are readable by all current standard facsimile machines, whereas certain other dyes are not. Thus, it is important in the present invention that the variable information 18 provided on the first form part 12 and replicated on the second form part 14 be readable by all currently standard facsimile machines. Obviously, the present invention may also be applicable to other types of information transfer systems, such as using carbon paper, provided only that the resulting information transferred onto the second form part is readable by a facsimile machine.

The second form part 14 may simply comprise a blank sheet of paper with no prerecorded or preprinted information thereon (although in the preferred carbonless transfer system it does have a reactive coating on its upper surface). Alternatively, the second form part 14 may have a limited quantity of prerecorded information. In accordance with the present invention, to the extent prerecorded information is provided the second form part 14, it would be of lesser quantity than the prerecorded information on the first form part 12 in order that the advantages of the present invention may be achieved. Also, any such prerecorded information provided the second part may be identical to only a portion of the prerecorded information on the first form part 12 or may be entirely different from or may correspond to some of the prerecorded information of the first part and include certain additional prerecorded information. Preferably, however, form part 14 is blank. Consequently, when the variable information is provided on first form part 12, it is transferred or replicated by carbonless transfer using the infrared adsorptive dyes onto the second form part 14. Of course, the variable information reproduced on the second form part 14 will lie in the exact areas of the second form part which underlie and correspond to the areas of the first form part 12.

In using the form set of the present invention and with reference particularly to FIG. 2, the variable information recorded on form 10 may be transmitted by facsimile machine. In FIG. 2, there is illustrated a sending facsimile machine, generally designated 20, and a receiving facsimile machine, generally designated 22. These facsimile machines may be of any standard type and identical one to the other for both sending and receiving. To transmit information in accordance with the present invention, only the second form part 14 is employed as the transmitting copy. Thus, the transmitting copy 14 is inserted into the sending slot of the sending facsimile machine 20 and transmitted over telephone lines, as generally indicated by the dashed arrow 24. It will be appreciated that the costs of transmitting facsimile messages is a function of the time of transmission and that the time of transmission is, in turn, a function of the quantity of information being transmitted. Thus, by wholly eliminating the prerecorded information from the transmission copy and which was used principally only to assist in the recording of the variable information on the form set, the quantity of information actually transmitted by the sending facsimile machine 20 is greatly reduced. Even if a minimal quantity of prerecorded information is provided on the second form part 14, the quantity of information transmitted and, hence, the time and cost of transmission, would be greatly reduced in comparison with the time and cost of transmission of the first form part 12 with both the prerecorded and variable information thereon.

The receiving facsimile machine 22, of course, reproduces the transmitted information on a blank receiving copy. In the preferred embodiment, only the variable information is thus reproduced on the receiving copy, designated 26 in FIG. 2. Of course, the variable information originally recorded on the second form part 14 will appear on the received copy 26 at the exact positions and spacing as it appeared on the second form part 14. Thus, the received copy may provide all the information that the recipient requires with respect to the variable information initially recorded on the form set.

Figure 3:
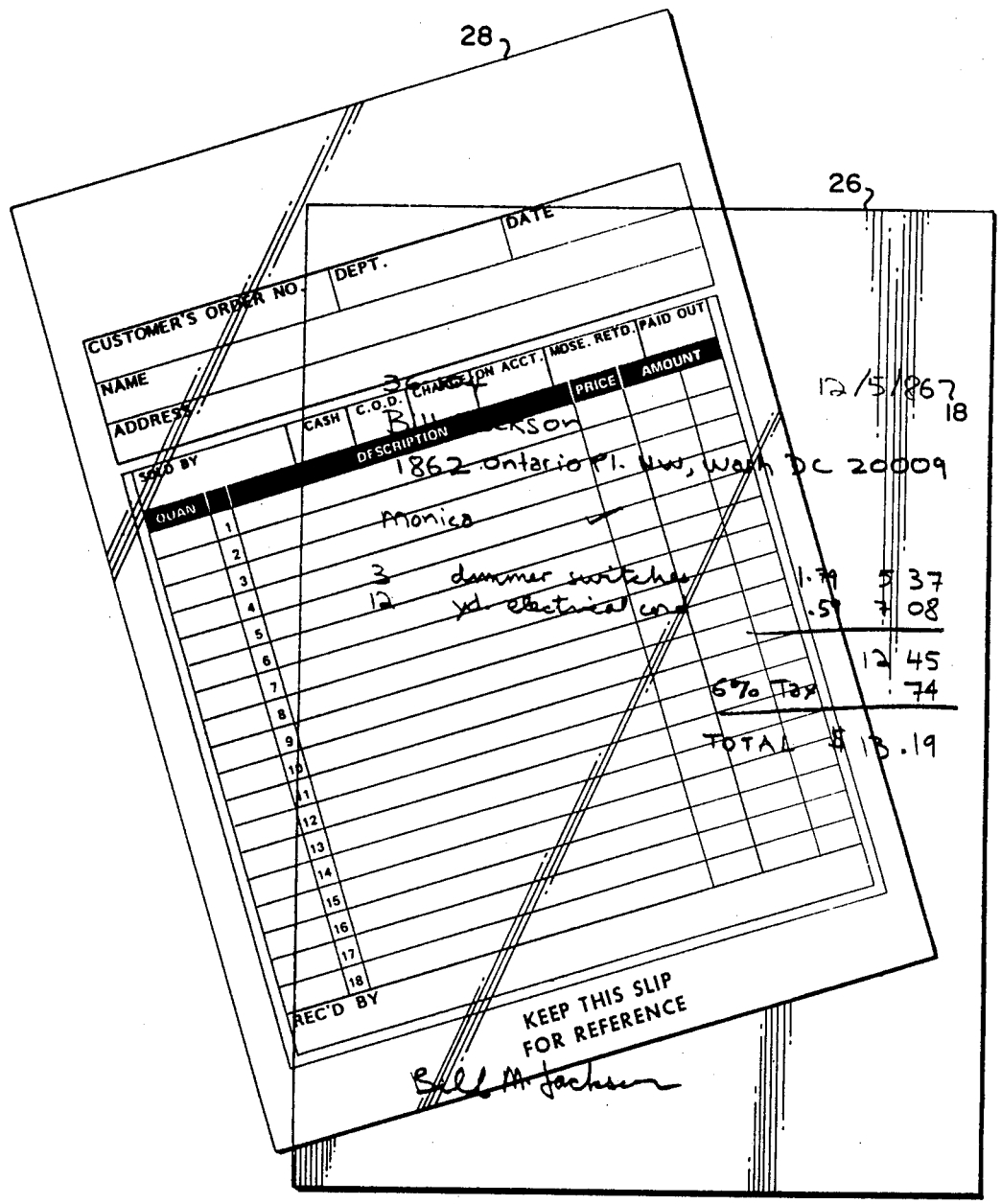
FIG. 3 is a plan view of an overlay for use With the receiVed facsimile copy whereby the prerecorded and variable information on the first part, or other prerecorded information together with the variable information may be reproduced.

If it is desired to reproduce the variable information recorded on the received copy 26, in the exact form in which it was originally presented on the form set 10, an overlay 28, as illustrated in FIG. 3, may be provided for this purpose. In FIG. 3, the received copy 26 is illustrated with the variable information 18 recorded thereon. The overlay 28 may have prerecorded nonvariable information thereon identical to the prerecorded information on the first form part 12. Overlay 28 is also preferably of transparent material. Thus, when the overlay is aligned with the received copy 26, the variable information 18 will appear in the appropriate and corresponding prerecorded information blocks on the overlay 28. A copy by suitable, well-known copying processes, of the overlay and the received copy 26 may then be made, with the result that the received information may be replicated and reproduced in the exact form as appears on the first form part 12, including the prerecorded information. This is illustrated in FIG. 4, where it will be observed that the variable information has been reproduced on the copy 30 in the exact same blocks as originally appearing on the first form part 12. As a consequence, the original information may be produced in the same usable form as it originally appeared on the first form part 12.

Alternatively, the overlay may have only a portion of or wholly different prerecorded information thereon than the prerecorded information on the first form part 12. Thus, it may be desirable to reproduce the variable information on a copy which combines it with different prerecorded information to provide a totally different form, as desired. That is, a different format may be used as part of the overlay at the receiving site in order that the variable information may have a different meaning.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-part form for receiving variable information and transmitting the variable information on a facsimile machine, comprising:
   a form set having first and second form parts;
   said first form part having preprinted information thereon;
   said second form part underlying said first form part and being entirely void of preprinted information thereon; and
   means carried by said set for transferring variable information recorded on said first part onto said second part such that the variable information recorded on said second part may be transmitted by facsimile using said second part as the facsimile transmittal copy.

2. A form according to claim 1 wherein said transfer means includes means carried by said first and second form parts cooperable to provide a carbonless transfer of the variable information from said first form part to said second form part.

3. A form according to claim 2 wherein said cooperable means includes an infrared adsorptive dye.

4. A form according to claim 1 including means for releasably connecting said form parts one to the other.

5. A method for transmitting by facsimile machine variable information recorded on a form set and correlating the transmitted variable information with prerecorded information, comprising the steps of:
   providing a form set having a first part and a second part;
   recording information including variable information on said first part;
   providing for carbonless transfer of at least a portion of said variable information recorded on said first part onto said second part;
   transmitting the information on said second part by facsimile machine using said second form part as the transmittal document thereby transmitting at least said portion of said variable information on said second part;

recording the transmitted information at a facsimile machine receiving site on facsimile receiving paper; and juxtaposing prerecorded information adjacent said received variable information on said facsimile receiving paper to facilitate correlation of the received variable information with the prerecorded information.

6. A method according to claim 5 wherein the step of juxtaposing includes providing an overlay having preprinted information and overlying the facsimile receiving paper with said overlay to juxtapose said received variable information and said preprinted information.

7. A method according to claim 6 including providing preprinted information on said overlay identical to the preprinted information on said first form part.

8. A method according to claim 6 including providing preprinted information on said overlay different than the preprinted information on said first form part.

9. A method according to claim 5 wherein the step of juxtaposing includes the step of providing preprinted information on said facsimile receiving paper to facilitate correlation of the received variable information therewith.

* * * * *